United States Patent [19]

Hassmann et al.

[11] Patent Number: 4,650,411
[45] Date of Patent: Mar. 17, 1987

[54] APPARATUS FOR MANUFACTURING WEBS OF SYNTHETIC THERMOPLASTICS

[75] Inventors: Werner Hassmann; Friedrich Blom, both of Lengerich, Fed. Rep. of Germany

[73] Assignee: Windmoller & Holscher, Lengerich of Westphalia, Fed. Rep. of Germany

[21] Appl. No.: 740,518

[22] Filed: Jun. 3, 1985

[30] Foreign Application Priority Data

Jun. 7, 1984 [DE] Fed. Rep. of Germany ... 8417374[U]

[51] Int. Cl.$^4$ .............................................. B29C 47/88
[52] U.S. Cl. ................. 425/174.8 E; 264/22; 425/224
[58] Field of Search ............ 264/22, 24, 27, 210.6, 264/216; 425/174, 174.8 E, 174.8 R, 223, 224; 250/324, 325; 361/230, 234

[56] References Cited

U.S. PATENT DOCUMENTS

| Re. 27,771 | 10/1973 | Owens et al. | 264/22 |
| 3,758,251 | 9/1973 | Gillyns et al. | 425/174.8 E |
| 4,517,143 | 5/1985 | Kisler | 264/24 |
| 4,534,918 | 8/1985 | Forrest, Jr. | 425/174.8 E |

Primary Examiner—Jay H. Woo
Assistant Examiner—J. Fortenberry
Attorney, Agent, or Firm—Fleit, Jacobson, Cohn & Price

[57] ABSTRACT

Apparatus for manufacturing webs of synthetic thermoplastics comprises a machine frame, a cooling roller mounted in said machine frame and provided with drive means, and an extrusion die mounted in said machine frame and spaced above said cooling roller and connected to a supply line for molten plastic material and having a die slot which faces the cooling roller and is parallel to a generatrix of said roller, also comprising two electrodes, which in the direction of rotation of the cooling roller precede the slot and are disposed adjacent to the lateral end portions of the slot and mounted in the machine frame and directed toward the cooling roller, and electric cables electrically connected to the electrodes and to the cooling roller. The electrodes consist of brush electrodes consisting of wire ends arranged like a brush.

3 Claims, 4 Drawing Figures

APPARATUS FOR MANUFACTURING WEBS OF SYNTHETIC THERMOPLASTICS

BACKGROUND OF THE INVENTION

1. Field of the Invention

This invention relates to apparatus for manufacturing webs of synthetic thermoplastics, comprising a machine frame, a cooling roller mounted in said machine frame and provided with drive means, and an extrusion die mounted in said machine frame and spaced above said cooling roller and connected to a supply line for molten plastic material and having a die slot which faces the cooling roller and is parallel to a generatrix of said roller, also comprising two electrodes, which in the direction of rotation of the cooling roller precede the slot and are disposed adjacent to the lateral end portions of the slot and mounted in the machine frame and directed toward the cooling roller, and electric cables electrically connected to the electrodes and to the cooling roller.

2. Description of the Prior Art

When a flat film of molten plastic material is extruded through a slot die onto a cooling roller, which is disposed below the slot die and rotates at a surface velocity which is equal to the extrusion velocity, that film will laterally contract on the cooling roller with formation of thickened marginal regions. That undesired phenomenon is described as "neck-in effect".

When the film of plastic material is extruded at a velocity of 60 to 70 m/min, the film which has just been extruded can be urged against the cooling roller by compressed air so that the neck-in effect will be avoided.

For an extrusion at higher velocities, high-voltage electrodes of the kind described first hereinbefore are used, which are known from U.S. Pat. No. Re. 27,771 and by which the thermoplastic film which has just been extruded is electrostatically charged in such a manner that it will subsequently adhere to the surface of the cooling roller and an entrapping of air by the film and the undesired necking of the film being cooled will be substantially avoided. The high-voltage electrodes used in the apparatus known from U.S. Pat. No. Re. 27,771 consists of wire electrodes, point electrodes or electrodes which extend like blades across the width of the extruded films. But it has been observed in practice that by means of such electrodes the freshly extruded film cannot be secured to the cooling roller so firmly that the undesired neck-in effect will be avoided.

SUMMARY OF THE INVENTION

For this reason it is an object of the invention to provide in an apparatus of the kind described first hereinbefore an improved electrode which produces in the cooling roller an electrostatic charge which is sufficient for an adequate fixation of the freshly extruded film of plastic material on the cooling roller.

This object is accomplished in accordance with the invention in that the electrodes consist of brush electrodes consisting of wire ends arranged like a brush. With the brush electrodes used in accordance with the invention, strong point discharges will be avoided, such as occur, e.g., where the known point electrodes are used. The brush electrodes result in soft brushlike discharges over a large area so that the freshly extruded stream of plastic material will be charged in such a manner that it will sufficiently adhere to the cooling roller so that the practical requirements will be met but the film will not exhibit an undesired necking.

The brush electrodes suitably consist of the end portions of many hundreds of thin wires. 200 to 1000 or more thin wires may be provided. Above the point where each brush electrode begins to fan out in the shape of a brush, its wires are suitably held together by a cuff of insulating material.

DETAILED DESCRIPTION OF THE PREFERRED EMBODIMENT

Figure 1:
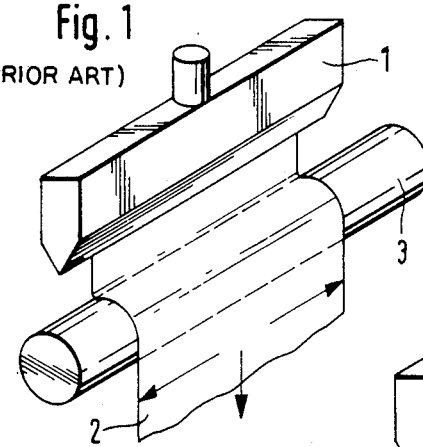
FIG. 1 is a diagrammatic perspective view showing a stream of plastic material which has been extruded from a slot die onto a cooling roller.

An illustrative embodiment of the invention will now be explained more in detail with reference to the drawing.

Figure 2:
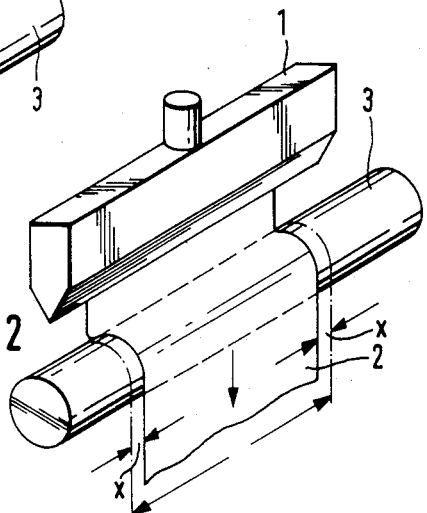
FIG. 2 is a view that is similar to FIG. 1 and indicates the neck-in effect.

When a film of plastic material 2 is extruded from a slot die 1 onto a cooling roller 3 rotating at a surface velocity that is equal to the velocity at which the film 2 is extruded, as is shown in FIGS. 1 and 2, the marginal regions of the plastic film will contract on the roller 3 by an amount x as shown in FIG. 2 so that the width of the film will be decreased by the amount 2x. That shrinkage by the amount 2x will be substantially avoided if the freshly extruded film 2 of plastic is sufficiently firmly retained on the cooling roller 3.

Figure 3:
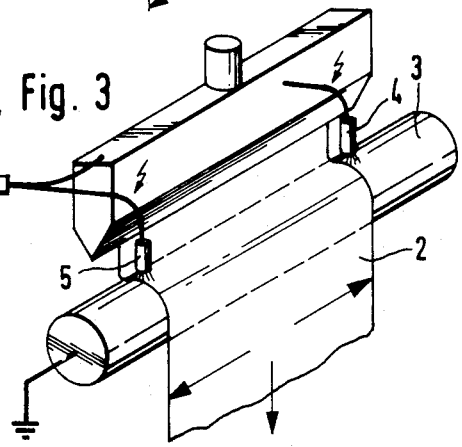
FIG. 3 is a view that is similar to FIG. 1 and shows an apparatus provided with brush electrodes and FIG. 4 is an enlarged elevation showing a brush electrode.
Figure 4:
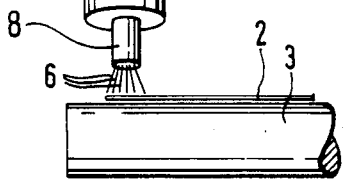

In order to secure the freshly extruded film of plastic 2 on the cooling roller, the apparatus shown in FIG. 3 comprises brush electrodes 4, 5, which are secured in the machine frame in a manner which is not shown and provided adjacent to both marginal portions of the freshly extruded plastic film 2. Said electrodes have end portions 6 fanning out in the shape of a brush and directed toward the marginal portions of the plastic film. Cuff 8 of insulating material is located above a point from which the wire end portions 6 fan out. The cooling roller 3 is grounded, as indicated, and a d.c. voltage of about 16 to 18 kV is applied to the brush electrodes. This high voltage results in numerous, hardly visible electric discharges from the several wires 6 of the brush electrode to ground. When the freshly extruded film of plastic 2 moves through the corona field thus established, the plastic will be charged and will be forced against the cooling roller 3.

The high voltage is generated by a transformer, which is succeeded by a rectifier 6' and a protective resistor 7.

We claim:

1. Apparatus for manufacturing a web of synthetic thermoplastics, said apparatus comprising
   a machine frame,
   a cooling roller mounted in said machine frame,
   drive means for driving said cooling roller,
   an extrusion die mounted in said machine frame spaced above said cooling roller and for connection to a supply line for molten plastic material, a die slot defined by said extrusion die which faces the cooling roller and extends parallel to a generatrix of said roller, two brush electrodes including wire ends arranged like a brush, which in the direction of rotation of the cooling roller precede the slot, said two brush electrodes being disposed adjacent to lateral end portions of the slot, mounted in the machine frame and directed toward the cooling roller, and electric cables electrically connected to the electrodes and to the cooling roller, said two brush electrodes producing numerous electric discharges to establish a corona field which charges said web produced from said extension die and forces the web against the cooling roller to avoid necking at the lateral end portions of the web.

2. Apparatus according to claim 1, wherein said two brush electrodes consist of the end portions of many hundreds of thin wires.

3. Apparatus according to claim 1, wherein said wire ends of each brush electrode are held together by a cuff of insulating material located above a point from which the wire ends fan out.

* * * * *